United States Patent [19]
Holmqvist

[11] Patent Number: 4,670,321
[45] Date of Patent: Jun. 2, 1987

[54] METHOD OF MANUFACTURING A PATTERNED, COLORED SURFACE ON AN OBJECT AS WELL AS AN OBJECT MANUFACTURED BY THE METHOD

[76] Inventor: Olle Holmqvist, 30, Norra Agatan, S-575 00 Eksjö , Sweden

[21] Appl. No.: 777,249

[22] Filed: Sep. 18, 1985

[30] Foreign Application Priority Data

Sep. 24, 1984 [SE] Sweden ............................ 84047547

[51] Int. Cl.[4] ............................ B32B 3/30; B32B 5/14; B05D 5/06; B05D 7/06

[52] U.S. Cl. .................................... 428/168; 427/264; 427/265; 427/270; 428/171

[58] Field of Search ............... 427/264, 270, 275, 276, 427/265; 428/204, 207, 208, 168, 171

[56] References Cited

U.S. PATENT DOCUMENTS 1,969,074 8/1934 Harshberger ........................ 428/168
3,968,288 7/1976 Trexler ........................... 428/168 X
4,135,024 1/1979 Callahan et al. .................... 428/171

FOREIGN PATENT DOCUMENTS 53-67768 6/1978 Japan .................................. 427/275

*Primary Examiner*—Evan K. Lawrence
*Attorney, Agent, or Firm*—Cohen, Pontani & Lieberman

[57] ABSTRACT

A method of manufacturing a patterned, colored surface on an object having a surface of relatively low surface absorption when compared to the interior of the object, and the article produced by the method. The method comprises the steps of first preparing the pattern on the surface of the object by contouring predetermined portions of the surface, so that recesses are created therein having a substantially greater surface absorption, and subsequently applying to the entire surface including the recesses a paint containing dye pigment, solvent, and about 0.5–8%, calculated on the entire quantity of the paint, of inert, non-soluble fine-grained particles having a maximum cross dimension which is substantially larger than the maximum cross dimension of the dye pigment. The particle sizes of the dye pigment and the inert fine-grained particles are such that (a) the dye pigment is sucked into the surface of the recesses having greater surface absorption while the inert fine-grained particles are retained on the surface of the recesses, and (b) the inert fine-grained particles settle on the surface portions of relatively low surface absorption and are covered over by the dye pigment.

11 Claims, 8 Drawing Figures

METHOD OF MANUFACTURING A PATTERNED, COLORED SURFACE ON AN OBJECT AS WELL AS AN OBJECT MANUFACTURED BY THE METHOD

BACKGROUND OF THE INVENTION

This invention relates to a method of preparing a patterned, colored surface on an object of wooden or cellulose material, in particular Masonite, veneer, chipboard, MDF-board or the like, as well as an object manufactured by the method.

Painting and coloring of surfaces on different materials may be carried out with paints of widely differing kinds and with application of one or several layers of paint and/or lacquers on the surface in different ways. In the matter of painting of surfaces of wooden or cellulose materials a completely or partly covering stain is often utilized as paint. In respect of articles of sheet-metal, e.g. cars, there is often used painting with a so-called metallic lacquer containing metal powder which is subsequently covered with at least one outer coating of a preferably clear lacquer.

An old method of painting a surface in two or more colors resides in painting each portion of the surface individually with the color intended for the portion in question (possible under-treatment and other treatment of the surface here being neglected). Another method of painting a surface, e.g. in two colors, resides in primarily painting the whole surface with one of the two intended paints and subsequently painting predetermined portions of the surface with a completely covering coating of the other paint.

A rational embodiment of the lastmentioned method which may be utilized in respect of profiled or relief-patterned surfaces resides in primarily painting the whole surface, e.g. by means of a soft paint roller, with a first paint and subsequently, after the required drying time, painting only the highest portions of the relief pattern with a different paint by means of a roller or the like which does not leave any paint in the valleys of the relief pattern. The relief pattern may be produced by milling grooves or recesses in the surface or creating them in another manner. This method accordingly requires at least two paint application operations.

In JP A-No. 58-137 472 there is disclosed a method of manufacturing a decorative wooden panel, which bears a striking resemblance to natural wood. The surface is brushed or rugged, so that the summer wood and the spring wood forms projections and dents, respectively. The rugged surface is first painted with a transparent resin lacquer after which a colored paint containing perl pigment is applied to the entire surface. Before the paint layer is dried part of the perl pigment is rendered oriented with respect to its condition, and the remainder is removed.

SUMMARY OF THE INVENTION

The principal object of the invention is to provide a simplified method of two-color patterning of a surface having higher or elevated portions and lower or depressed portions, respectively, by one single application of paint.

A further object of the invention is to provide objects or articles which have been manufactured by the aforementioned simplified method.

Through the invention there is accordingly provided a first, predetermined color tint on the elevated or higher portions of the object which have a retained or maintained surface coating and on the lower portions of the object there is simultaneously provided a second color tint contrasting with said first color tint, by means of one single application of paint.

BRIEF DESCRIPTION OF THE DRAWINGS

In the annexed drawings there are disclosed as non-limiting examples wooden fibreboards which have been pattern-painted according to different embodiments of the method according to the invention.

DESCRIPTION OF THE PREFERRED EMBODIMENTS

Figure 1:
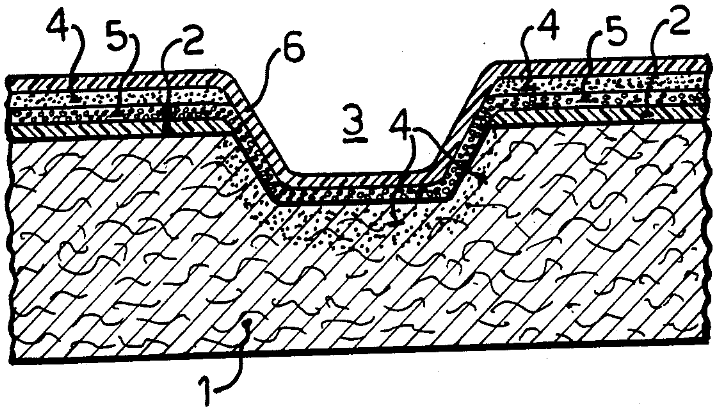
FIG. 1 is a partial cross-sectional view on a larger scale through a board or panel which has been treated or prepared according to the invention.

The invention primarily relates to pattern-painting of objects of wood or cellulose material, such as solid wood and board of different kinds, particularly Masonite, veneer, chipboard, so-called MDF-board (Medium Density Fibreboard), other fibreboards and the like, and secondly to such pattern-painted objects. Important fields of use for such objects in the shape of panels and plates are cupboard doors, door blades, wall panels and possibly table tops, bedstead ends, bedstead sides, picture frames, fillets, ceiling panels, and so on.

If a pronounced contrast between the higher and the lower portions of the surface is desired, it is in many cases, particularly in respect of chipboard and other board not having a tight surface, recommended to lacquer the surface to be painted with a clear lacquer or prime the surface with a surfacer, e.g., a completely covering paint or stain to reduce or eliminate the sucking or absorbing property of the surface.

After a possible preliminary lacquering with a clear lacquer or other priming the embossing or relief-patterning of the surface is carried out. Shallow grooves preferably having a considerably greater width than depth are milled in the surface in a predetermined pattern in the preferred embodiment. Virtually any pattern may be created by means of computerized milling cutters now coming into use. Instead of milling the grooves, these may possibly be provided through another chip or material removing treatment or by depression, e.g. by means of an exchangeable, relief-patterned roller.

The paint intended for the painting and preferably constituting a completely covering paint with normal dye pigments, such as fine-ground micro pigments and/or soluble colouring agents, contains according to the invention a fine-grained powder of inert particles of metal, metal alloy or metal compund, glass, plastic or the like. The fine-grained micro-pigments preferably have a maximum cross dimension $\leqq 1\mu$. The inert paint particles or powder grains are insoluble in the solvent and are preferably hard but may also consist of a softer material. By "inert" above it is meant that the particles are such (or treated in such a manner) that they do not become colored by the other dye agents comprised in the paint. When the inert particles are of metal, they may consist e.g. of aluminum or copper or of an alloy, particularly so-called gold bronze. A suitable material for the inert particles is perl pigment, i.e. minute glimmer grains which have been coated with a transparent, translucent or opaque paint coating. Such transparent or translucent paint coatings are suitable also with inert particles in the form of metal powder, such as aluminum powder. The size of the inert particles should be less than some hundred μ. A preferred size range is 2–200μ, preferably less than 20μ, and 5μ is a good value. The particle size is dependent on the shape of the particle or grain and its ability to remain on the surface of a sucking or absorbing substrate or basis. For instance aluminium pigment may be only about 7μ, while a glimmer pigment may be 10–80μ in cross section. In any case the coarser, inert particles shall have a maximum cross dimension which is considerably larger than the maximum cross dimension of the dye pigments.

Examples of inert, coarser particles are:

| | |
|---|---|
| Aluminum powder | CBRF Crown Silver, approximately 7μ<br>Carlfors Bruk, Husqvarna Sweden |
| Bronze | Stapa Reichbleichgold 9900/4, approximately 7μ<br>Eckartwerke, Furth-Bayern, FRG |
| Colored mica | |
| Iriodin Perlglanzpigmente Rot-braun, 10–60μ | |
| Glitterbronze 530, 15–130μ<br>Merck, Darmstadt, FRG | |
| Mearlin Copper, 5–40μ<br>The Mearl Corporation, New York, USA | |
| Polyesterflitter | 25/200 RD Blau, approximately 100μ<br>Dragon-Werk Georg Wild, Bayreuth, FRG |
| Glasdiamantine (Coloured glass balls) | Echtschwarz, approximately 100μ<br>Dragon-Werk |
| Coloured Polyurethan | Dekosilk Rot<br>Chemische Fabrik Uetikon<br>CH-8707 Uetikon am See, Switzerland |

The proportion of inert paint particles should be between about 0.1% and about 20% and preferably amounts to 0.5–10%. Usual proportions are 1–5%, all calculated on the total amount of finished paint. The total amount of dye pigments is usually between about 2% and about 25%.

The paint also contains a limited amount of binder. The binder composition is so selected that the binder together with the finer dye pigments are sucked in into the grooves but also covers the coarser, inert pigments on the non-absorbing surface to a desired extent. Examples of binders are: Nitrocellulose VF-1 from Bofors AB, Sweden and Cellulose acetobutyrate 0.05 from Eastman, USA. The proportion of binder should generally be between 2% and 25%, preferably below 10% to 15%. The penetration depth of the paint in wood or cellulose material may be controlled by the addition of silicon oxide.

The paint is so constructed that the finer dye pigments determine the tint of the non-absorbing portions of the substrate by covering the coarser particles, and the coarser particles determine the tint of the absorbing portions (grooves or the like), where the finer dye pigments are sucked into the substrate. The covering ability is obtained by making either the smaller dye pigments (the micro-pigments) or the inert particles, e.g. aluminum powder colored by transparent or translucent dye agents covering them. To prevent inert particles in the form of comparatively heavy metal grains from falling to the bottom of the paint container from which the paint is applied, the paint should contain an additive of a plastic product in the shape of an artificial wax (a so-called micro-wax) and/or a plasticizer or softener or the like. Instead of (or as a supplement to) such a wax, continous agitation of the paint in the paint container may be used.

In the following table 1 there are specified eleven sample plates which have been manufactured according to the invention.

TABLE 1

| | | Paint component (inert particles) in the grooves (absorbing substrate) | | | Paint component (dye) on remaining sure faces (non-absorbing substrate) | | | | |
|---|---|---|---|---|---|---|---|---|---|
| Sample No. | Substrate | Type of pigment | Grain size | % | Binder % | Pigment grain size | Pigment | Pigment proper-tion % | Remarks |
| 1 | Board, primed with white surfacer | Perl pigment | 10–60μ | 2 | 7.5 | 1μ | white | 15 | |
| 2 | Board, primed with white surfacer | " | " | 2.5 | 6 | " | white, oxide yellow, oxide red | 15.5 | |
| 3 | Board, primed with white surfacer | " | " | 2.1 | 3 | " | white, black, blue | 8.5 | |
| 4 | Board, primed with white surfacer | " | " | 2 | 7.5 | " | white, black | 15.2 | |
| 5 | Board, primed with white surfacer | Bronze | 6.5μ | 3 | 6.5 | " | orange, red | 3.5 | |
| 6 | Board, primed with white surfacer | Aluminum | 3μ | 1.3 | 5.5 | " | blue, black | 3 | |
| 7 | Board, primed with white surfacer | Polyurethan | 10–30μ | 4 | 7 | " | white | 15 | |
| 8 | Board, primed with white surfacer | " | 10–30μ | 3 | 7.5 | " | white | 15 | |
| 9 | MOF-board primed with clear lacquer | Aluminium | 3μ | 1.3 | 5.5 | " | blue, black | 3 | =6 |
| 10 | MOF-board primed with clear lacquer | Perl pigment | 10–60μ | 2.1 | 3 | " | white, black, blue | 8.5 | =3 |
| 11 | MOF-board primed with clear lacquer | " | 10–60μ | 2.2 | 8.5 | " | white | 16 | |

The paint is suitably applied by spray painting or by means of a rubber roller, alternatively a curtain machine or even a brush may be used for application of the paint. All known application methods are conceivable.

As the last measure in the carrying out of the painting method according to the invention one or more coatings of a clear lacquer are suitably applied upon the stain or paint coating containing the metal powder or the like.

FIG. 1 illustrates part of a sample plate or board which has been treated and painted according to the invention. 1 designates a plate of MDF-board or the like and 2 a coating of priming lacquer or surfacer which has been applied to the plate and which may possibly be omitted if the surface of the plate is substantially completely tight (non-absorbing). 3 is a groove in which the surface layer and the lacquer coating 2 has been milled away or removed in another way so that the surface of the groove has become absorbing. The plate has been painted with a paint consisting of two components 4 and 5, respectively, of which the first one 4 contains a binder, solvent and dye pigments having a particle size less than 1$\mu$, and the other component 5 is comprised of inert particles the shape of dye pigments having a particle size within the range about 10–80$\mu$. The component 4 is sucked into the absorbing surface of the groove 3 but settles upon the component 5 on the non-absorbing surface of the plate 1. The component 5 settles upon the absorbing surface of the groove 3 which has been colored by the component 4, and immediately upon the priming lacquer coating 2, i.e. under the component 4 on the non-absorbing surface. 6 designates a possible top layer of clear lacquer.

Figure 2:
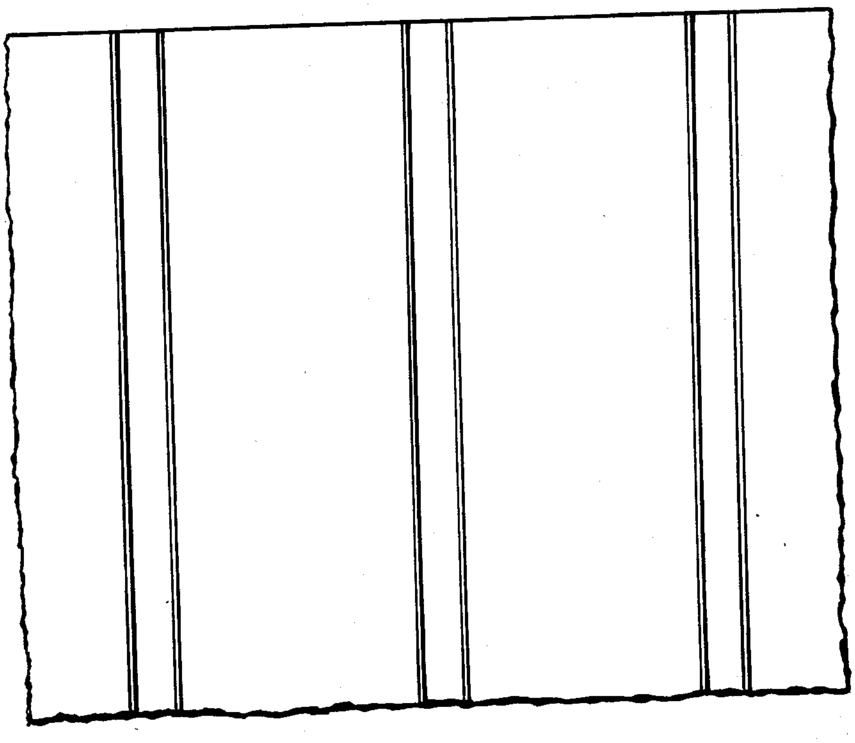
FIGS. 2–8 are plan views of plates or panels which have been treated and painted in accordance with the invention.

FIG. 2 is a plan view of a masonite board which has initially been painted with a completely covering paint, according to the invention, upon which subsequently two coatings of clear lacquer have been applied.

Figure 3:
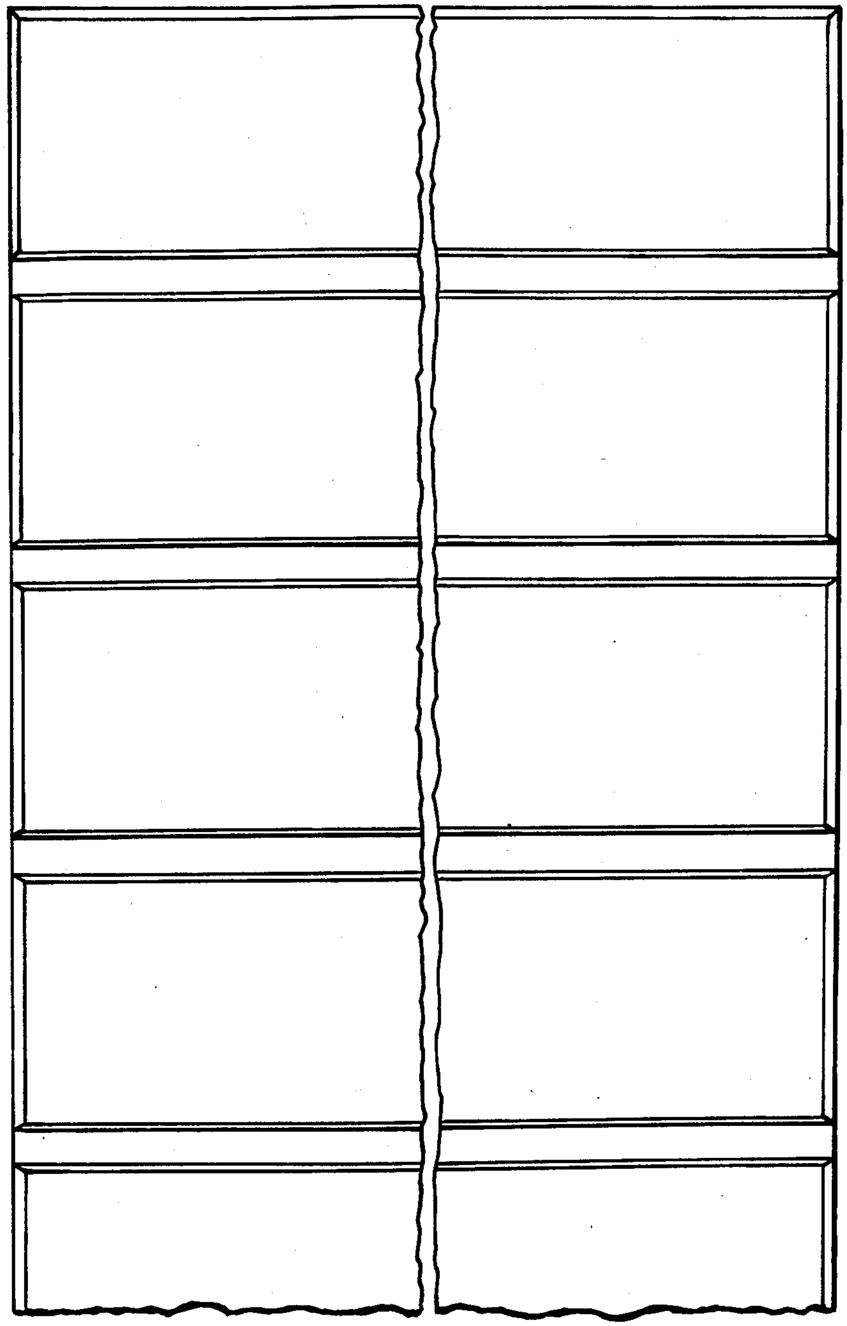

FIG. 3 is a similar plan view of a masonite board which has first been primed with a barrier coating of clear lacquer, after which a stripe pattern of grooves has been milled in the lacquered surface upon which subsequently a coating of a completely covering paint according to the invention has been applied, after which the surface treatment was finished by the application of a coating of clear lacquer.

Figure 4:
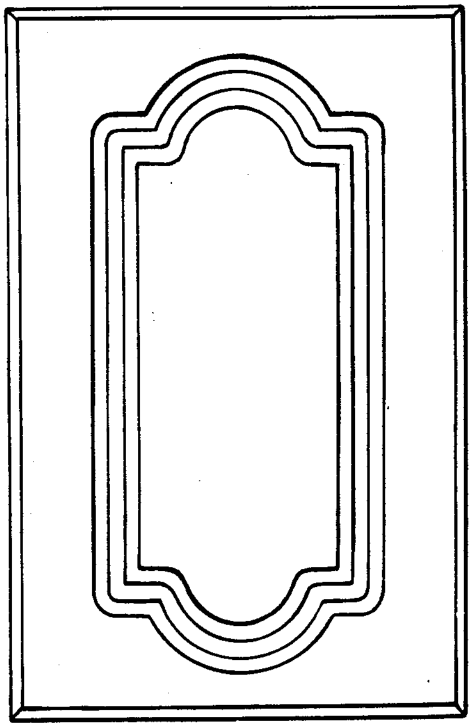
Figure 5:
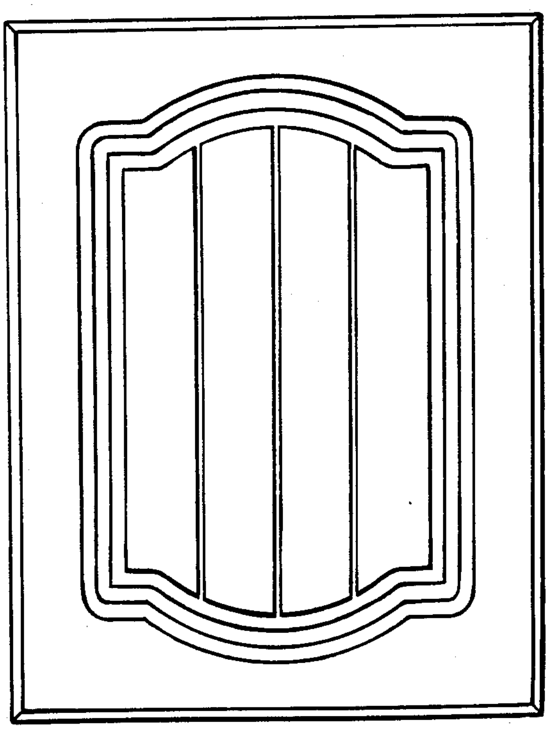

FIGS. 4 and 5 represent examples of cupboard doors manufactured according to the invention.

Figure 6:
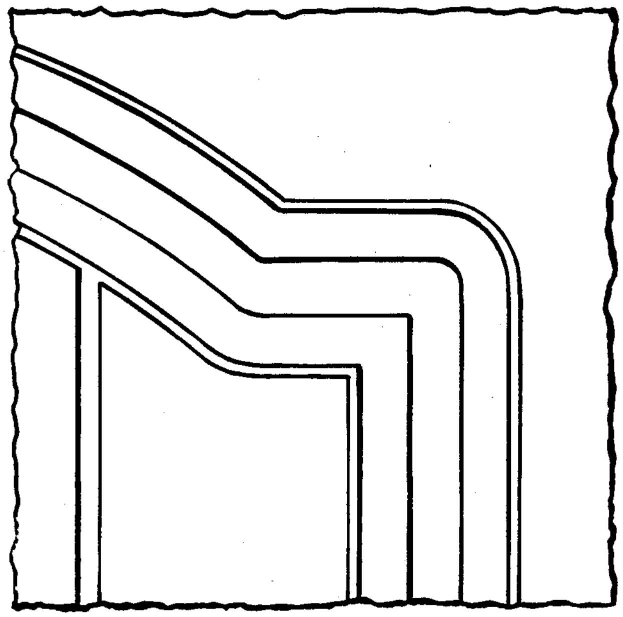

FIG. 6 is a plan view which on a larger scale illustrates part of a somewhat modified cupboard door which corresponds to sample 11 of table 1.

Figure 7:
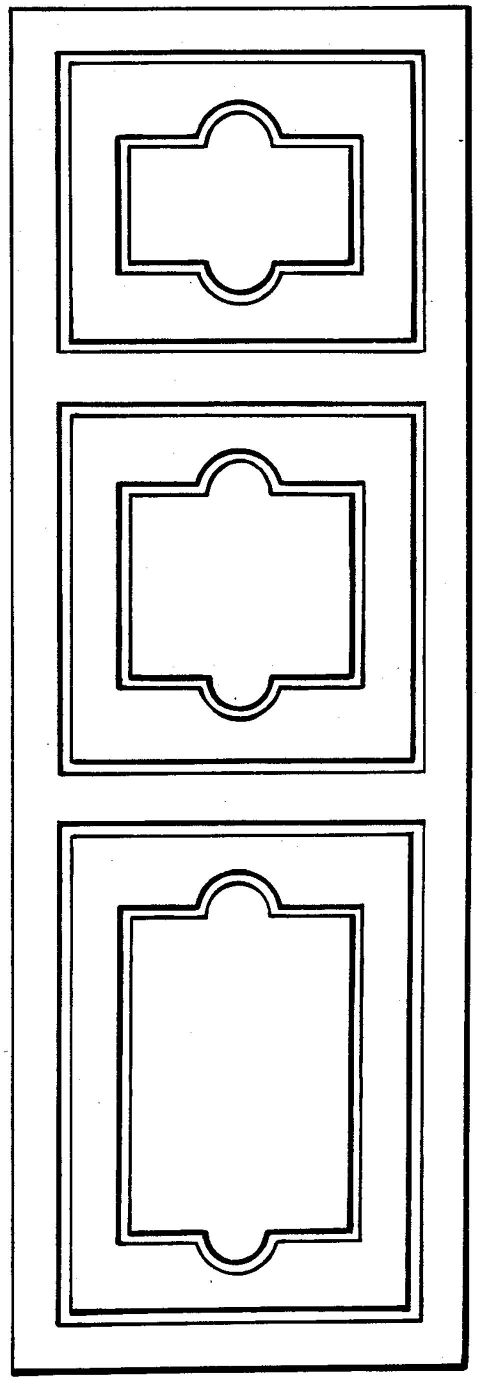

FIG. 7 is a plan view of a wardrobe door which has been surface treated and painted according to the invention.

Figure 8:
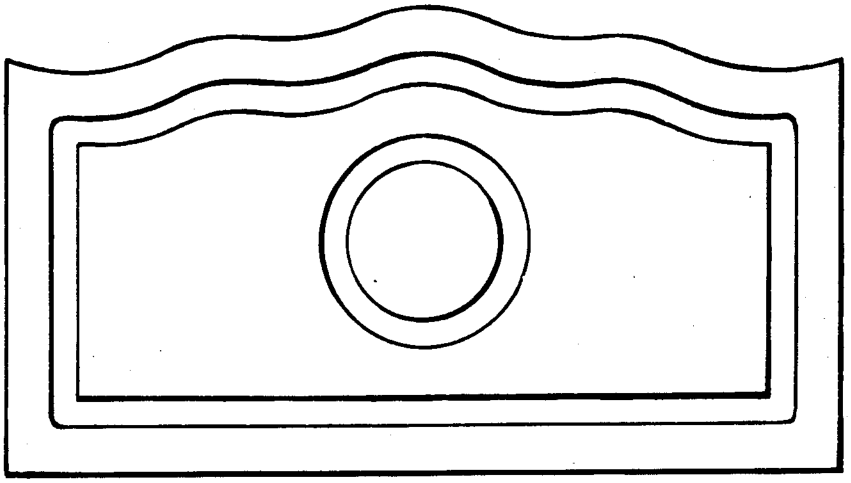

FIG. 8 illustrates an end of a bedstead manufactured according to the invention.

The number of paint combinations which may be obtained on objects treated according to the invention is substantially unlimited. Examples of such paint combinations on sample plates manufactured according to the invention are:

light blue—dark blue
light brown—dark brown
grey—brown
dark blue—dark brown
white—red-brown
red—red-brown
blue—blue-green
red—gold
brown—gold
blue—gold
grey—gold
light pink—dark pink The embodiments described above and illustrated in the drawings are, of course, to be regarded merely as non-limiting examples and may as to their details be modified in several ways within the scope of the following claims. Thus also three-dimensional, particularly circular-cylindrical, objects may be provided which have been pattern-painted in accordance with the invention.

What I claim is:

1. A method of manufacturing a patterned, colored surface on an object having a surface of relatively low surface absorption when compared with the interior thereof, comprising the steps of first preparing the pattern on the surface of said object by contouring predetermined portions of the surface, so that recesses or indentations are created therein having substantially greater surface absorption and subsequently applying to the entire said surface including said recesses a paint containing dye pigment, solvent, and about 0.5–8%, calculated on the entire quantity of said paint, of inert, non-soluble, fine grained particles, having a maximum cross dimension which is substantially larger than the maximum cross dimension of the dye pigment, whereby the particle sizes of said dye pigment and said inert fine-grained particles are such that (a) said dye pigment is sucked into the surface of said recesses having greater surface absorption while said inert fine-grained particles are retained on the surface of said recesses, and (b) said inert fine-grained particles settle on said surface portions of relatively low surface absorption and are covered by said dye pigment.

2. A method according to claim 1, wherein said inert, fine-grained particles are perl pigment.

3. A method according to claim 1, wherein said paint further comprises binding agents not in excess of 25%.

4. A method according to claim 1, further comprising the step of maintaining a substantially uniform distribution of the particles during the application of the paint by substantially continuous agitation of the paint.

5. A method according to claim 1, wherein said paint further comprises an artificial micro-wax for maintaining a substantially uniform distribution of the particles.

6. A method according to claim 1, wherein the surface is clear-lacquered or primed with a completely covering paint or stain prior to contouring the surface to lower the surface absorption of portions of said surface.

7. A method according to claim 1, wherein the surface is clear-lacquered as the last measure in the preparation of the pattern.

8. A method according to claim 1, wherein the maximum cross dimension of said fine grained particles is between 2–200$\mu$.

9. A method according to claim 8, wherein the inert fine-grained particles are selected from the group consisting of copper aluminum, bronze, other metal alloys, a metal compound, glass, mica, and plastic.

10. A method according to claim 1, wherein the maximum cross dimension of said fine grained particles is less than 20$\mu$.

11. An article of wooden or cellulose material having at least one painted surface which has been prepared by means of the method according to any of the preceding claims 1–10.

* * * * *